UNITED STATES PATENT OFFICE.

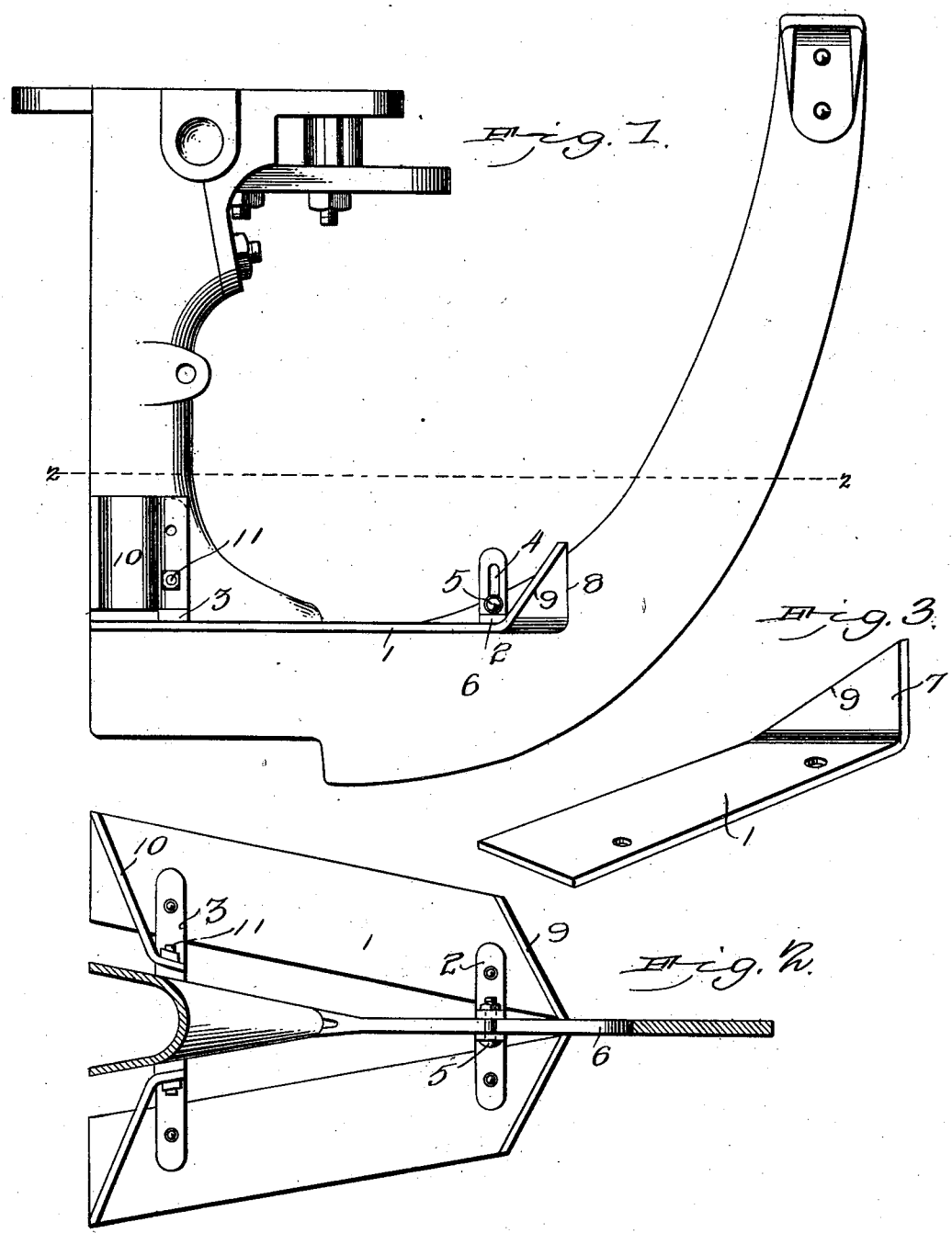

JAMES HARVEY LITTLER, OF CENTERFIELD, OHIO.

GAGE FOR SEED-PLANTERS.

SPECIFICATION forming part of Letters Patent No. 713,228, dated November 11, 1902.

Application filed September 26, 1902. Serial No. 125,001. (No model.)

*To all whom it may concern:*

Be it known that I, JAMES HARVEY LITTLER, a citizen of the United States, residing at Centerfield, in the county of Highland and State of Ohio, have invented a new and useful Gage for Seed-Planters, of which the following is a specification.

This invention relates to gages for seed-planters having for their object to regulate the depth to which the furrow-opening members of such implements shall be permitted to enter into the soil, consequently regulating the depth at which the seeds are deposited.

The invention has special reference to a gage or device of this class adapted to be attached to and used in connection with the runners of corn-planters for the purposes above indicated.

It has for its object to provide a device of this class which shall possess superior advantages in point of simplicity, durability, and general efficiency; and with these ends in view it consists in the improved construction, arrangement, and combination of parts, which will be hereinafter fully described, and particularly pointed out in the claims.

In the accompanying drawings, Figure 1 is a side elevation showing the runner of a corn-planter equipped with my improved gage. Fig. 2 is a horizontal sectional view taken on the line 2 2 in Fig. 1. Fig. 3 is a perspective detail view of one of the side members of the gage.

Corresponding parts in the several figures are indicated by similar characters of reference.

My improved planter-gage is composed of two side members, each consisting of a horizontally-disposed plate 1, provided near its front and rear ends with L-shaped brackets 2 3, having slots or openings 4 to receive bolts 5, whereby the said members may be connected adjustably with the runner 6 of a corn or other seed planter. The horizontal plates or side members 1 are provided at their front ends with obliquely-disposed flanges 7, the inner edges of which are disposed to lie flat against the sides of the runner, as at 8, while their outer edges are sloped downwardly, outwardly, and rearwardly to the outer edges of the plates 1, as indicated at 9.

To the vertical members of the L-shaped brackets 3, near the rear ends of the gage-plates 1, are secured outwardly and rearwardly extending wings 10, the position of which is vertical with relation to the plates 1. These wings may be secured detachably in any approved manner, as by bolts 11.

The operation of this device will be readily understood from the foregoing description, taken in connection with the drawings hereto annexed. When the runner equipped with my improved gaging device is in operation, the said gage prevents it from entering into the soil beyond the depth to which it has been adjusted. The peculiarly-disposed flanges at the front ends of the horizontal plates will not ride over obstructions—such as clods, stones, and the like—whereby the runner would be raised or lifted out of its appointed path. Such obstructions will rather be swept out of the path of the runner and will in no wise interfere with the operation of the device.

Another important feature of my invention consists in the wings or flanges 10, secured to the brackets 3 near the rear ends of the plates. These wings prevent any obstructions that in the progress of the machine may lodge upon the plates 1 from rolling off in the wake of the runner and covering the seed to an improper depth. Such obstructions will naturally be swept off in a lateral and outward direction, where their presence will not be objectionable.

I desire it to be understood that while I have described a preferred form of my invention I do not limit myself with regard to the details thereof, but reserve the right to any changes and modifications which may be resorted to without sacrificing the utility or departing from the spirit and scope of my invention.

Having thus described my invention, what I claim is—

1. A gage for seed-planters comprising a pair of horizontally-disposed plates, means for connecting said plates vertically adjustably to a runner of a seed-planter and oblique upturned flanges at the front ends of said plates, the inner edges of said flanges being disposed approximately in contact with the sides of the runner, and the outer upper edges of said flanges being sloped downwardly, rearwardly and outwardly to the outer edges of the plates.

2. A gage for seed-planters comprising a pair of plates having obliquely-upturned flanges at their front ends.

3. A gage for seed-planters comprising a pair of plates having obliquely-upturned flanges at their front ends and L-shaped brackets near their front and rear ends.

4. In a gage for seed-planters, the horizontally-disposed gage-plates having L-shaped brackets, in combination with vertically-disposed wings connected with the rear brackets.

5. A gage for seed-planters, comprising a pair of blades horizontally disposed and having L-shaped brackets, obliquely-upturned flanges at the front ends of said plates, vertically-disposed outwardly and rearwardly extending wings connected with the brackets at the rear ends of the said plates, and means for securing the device, vertically adjustably, to the runner of a seed-planter.

In testimony that I claim the foregoing as my own I have hereto affixed my signature in the presence of two witnesses.

JAMES HARVEY LITTLER.

Witnesses:
CHAS. E. HIXSON,
CHAS. F. ROGERS.